(12) United States Patent
Thigpen

(10) Patent No.: US 11,009,672 B2
(45) Date of Patent: May 18, 2021

(54) DEVICE AND METHOD FOR AERIALLY SUSPENDING AN OPTICAL CABLE TERMINATION BOX

(71) Applicant: CommScope Technologies LLC, Hickory, NC (US)

(72) Inventor: Thomas A. Thigpen, Highland Village, TX (US)

(73) Assignee: CommScope Technologies LLC, Hickory, NC (US)

( * ) Notice: Subject to any disclaimer, the term of this patent is extended or adjusted under 35 U.S.C. 154(b) by 207 days.

(21) Appl. No.: 16/288,714

(22) Filed: Feb. 28, 2019

(65) Prior Publication Data

US 2019/0265429 A1    Aug. 29, 2019

Related U.S. Application Data

(60) Provisional application No. 62/636,373, filed on Feb. 28, 2018.

(51) Int. Cl.
| | |
|---|---|
| *A47H 1/10* | (2006.01) |
| *G02B 6/48* | (2006.01) |
| *F16B 45/00* | (2006.01) |
| *F16B 13/02* | (2006.01) |
| *G02B 6/44* | (2006.01) |

(52) U.S. Cl.
CPC .............. *G02B 6/483* (2013.01); *F16B 13/02* (2013.01); *F16B 45/00* (2013.01); *G02B 6/4472* (2013.01)

(58) Field of Classification Search
CPC ........ G02B 6/483; G02B 6/44; G02B 6/4469; G02B 6/4471; F16B 45/00; F16B 13/02

USPC ........... 248/318, 317; 385/92, 100, 134, 136
See application file for complete search history.

(56) References Cited

U.S. PATENT DOCUMENTS

| | | | | |
|---|---|---|---|---|
| 4,939,821 A | * | 7/1990 | Frank, Jr. ............... | H02G 7/056 24/115 M |
| 5,142,745 A | * | 9/1992 | Setty ....................... | F16G 11/02 24/115 M |
| 5,322,132 A | * | 6/1994 | Franks, Jr. ............. | H02G 7/056 174/41 |
| 6,438,300 B1 | * | 8/2002 | Bernstein ............. | G02B 6/4471 385/100 |
| 6,581,251 B2 | * | 6/2003 | Malin ..................... | H02G 7/056 174/79 |
| 6,648,279 B1 | * | 11/2003 | Malin ..................... | H02G 7/053 174/44 |
| 7,234,669 B2 | * | 6/2007 | Franks, Jr. ................ | F16L 3/10 174/40 CC |
| 7,292,763 B2 | | 11/2007 | Smith | |
| 7,367,534 B2 | * | 5/2008 | Franks, Jr. ............... | G02B 6/00 248/74.1 |
| 7,558,458 B2 | | 7/2009 | Gronvall | |
| 7,567,741 B2 | | 7/2009 | Abernathy | |
| 7,672,556 B2 | * | 3/2010 | Keller .................. | G02B 6/4495 385/113 |
| 8,824,852 B2 | * | 9/2014 | Harvey ................ | G02B 6/4471 385/136 |

(Continued)

*Primary Examiner* — Todd M Epps
(74) *Attorney, Agent, or Firm* — Merchant & Gould P.C.

(57) ABSTRACT

Device having a support for aerially suspending an optical fiber termination box to which an optical cable is routed. Features of the device are adapted to transfer cable load to the support thereby bypassing the optical fiber termination box, which can help to prevent damage to the optical fiber termination box and the optical fibers it supports.

22 Claims, 5 Drawing Sheets

(56) References Cited

U.S. PATENT DOCUMENTS

| | | | | |
|---|---|---|---|---|
| 10,697,516 B2* | 6/2020 | Malin | ................ | F16G 11/14 |
| 2008/0292253 A1* | 11/2008 | Keller | ................ | G02B 6/4495 |
| | | | | 385/101 |
| 2014/0348482 A1* | 11/2014 | Vastmans | ................ | G02B 6/4471 |
| | | | | 385/136 |
| 2018/0164523 A1* | 6/2018 | Stancyk | ................ | G02B 6/4471 |
| 2019/0121035 A1* | 4/2019 | Al Ghossein | ................ | G02B 6/483 |

* cited by examiner

DEVICE AND METHOD FOR AERIALLY SUSPENDING AN OPTICAL CABLE TERMINATION BOX

CROSS-REFERENCE TO RELATED APPLICATION

The present application claims priority to U.S. Provisional Patent Application Ser. No. 62/636,373, entitled DEVICE AND METHOD FOR AERIALLY SUSPENDING AN OPTICAL CABLE TERMINATION BOX filed on Feb. 28, 2018, the disclosure of which is hereby incorporated by reference in its entirety.

BACKGROUND

Subscribers to data/communications providers can be connected to data networks with optical fibers. In the case of residences or other subscriber buildings, optical fibers can be routed in a main cable along power lines and then aerially routed to the building, connecting telecommunications equipment at a utility pole with telecommunications equipment at the subscriber building.

To reduce the number of separate cables that must be routed from the utility pole to the subscriber location (e.g., when the subscriber location includes multiple subscribers, such as in the case of a multi-dwelling unit), the multiple optical fibers are often combined into a single drop cable that is aerially suspended between the utility pole and the subscriber location. At the provider side of the drop cable, the drop cable is terminated at an optical cable termination box, which is itself affixed to the utility pole. The termination box is a robust weather-proof enclosure that can house structures for separation, routing, splicing, and/or organizing of the multiple optical fibers of the drop cable and linking those fibers, via ports, to the main optical cable.

In some regions, there are fees associated with affixing structures, such as optical cable termination boxes, directly to utility poles. In addition, in existing arrangements, the load of the drop cable is transferred directly to the optical cable termination box to which it is connected and routed, potentially straining or damaging the termination box, particularly when the load of the drop cable shifts or increases due to, e.g., weather, an object that falls on the drop cable, or a technician working in the area.

SUMMARY

According to certain aspects of the present disclosure there is provided a support for mounting and aerially suspending an optical cable termination box, the optical cable termination box having a cable routed thereto, the support comprising: a body for supporting at least a portion of a weight of the optical cable termination box; a first coupler for coupling the body to an aerial location of a structure; and a second coupler for coupling the body to an optical cable such that a load of the optical cable bypasses the optical cable termination box and is at least partially transferred to the support through the body.

According to further aspects of the present disclosure there is provided a support for mounting and aerially suspending an optical cable termination box, the optical cable termination box having a cable routed thereto, and the support extending from a proximal end to a distal end and comprising: a body for supporting at least a portion of a weight of the optical cable termination box; a first coupler for coupling a proximal portion of the support to an aerial location of a structure; and a second coupler for coupling a distal portion of the support to the cable such that a load of the optical cable bypasses the optical cable termination box and is at least partially transferred to the support through the body.

Non-limiting examples of the structure include a utility pole or other telecommunications structure, or a building.

In some examples, the cable is a drop cable having a jacket surrounding a plurality of optical fibers.

In some examples, one or more optical fibers from the cable are connected, via one or more ports of the optical cable termination box, to one or more optical fibers in a main optical cable that is supported by and/or routed via the structure.

In some examples, the drop cable is routed from the cable termination box to a subscriber location, such as a residence, an office building, or another multi-dwelling unit.

In some examples, the first coupler and/or the second coupler comprises a through hole.

In some examples, the first coupler and/or the second coupler comprises a hook or a portion of a hook.

In some examples, the first coupler and/or the second coupler comprises one or more straps or other fasteners, such as but not limited to: ties, nails, hooks, screws, bolts, pins, staples, etc.

The optical cable termination box can be any shape. In some examples, the optical cable termination box comprises a base and a cover that sealingly cooperate to define an interior volume housing one or more fiber organizing, routing, splicing, and/or splitting structures, wherein the cover defines one or more pluggable ports for selectively receiving fiber optic connectors terminating optical fibers that can be connected, via the termination box, to the optical fibers of the drop cable. Examples of such connectors include single fiber connectors and multi-fiber connectors. The connectors can be standard or ruggedized. In some examples, the optical cable termination box is coupled to the support such that the base faces the body of the support and is closer to the body of the support than the cover, thereby facilitating access to the cover and the ports defined by the cover. Non-limiting examples of optical cable termination boxes that can be supported by the supports of the present disclosure are described in U.S. Pat. No. 7,292,763, the contents of which are hereby fully incorporated by reference.

In some examples, the body of the support comprises a plate, or a bracket having a plate, to which the termination box is coupled and/or affixed. In some examples, the plate has a major surface that defines a plane, and the first coupler comprises a flange extending from the plate. In some example the flange includes a through hole for coupling to a complementary fastener, e.g., a hook secured to the structure (e.g., a utility pole). In some examples, the flange extends from the plate in a direction that is non-parallel to the plane defined by the major surface of the body. In some examples, the flange extends from the plate at an oblique angle to the plane defined by the major surface of the body. In some examples, the flange extends from the plate perpendicularly to the plane defined by the major surface of the body.

According to further aspects of the present disclosure, a kit comprises: a first hook, e.g., a J-hook, adapted to be secured to a structure (e.g., a utility pole) at an aerial location; and/or a second hook, e.g., an S-hook; and/or a cable clamp adapted to clamp a cable; and/or a support for mounting and aerially suspending an optical cable termination box, the optical cable termination box having the cable routed thereto, and the support extending from a proximal end to a distal end and comprising: a body for supporting at least a portion of a weight of the optical cable termination box; a first coupler for coupling a proximal portion of the support to the first hook at the aerial location of the structure; and a second coupler for coupling a distal portion of the support to the cable using the second hook and the cable clamp, such that a load of the optical cable bypasses the optical cable termination box and is at least partially transferred to the support through the body; the kit optionally further comprising one or more fasteners (e.g., straps) for coupling the termination box to the support.

In some examples, the cable includes one or more strength members, and the cable clamp is clamped to at least one of the one or more strength members.

In some examples, a proximal portion of the cable clamp comprises a looped component adapted to loop around the second hook, and a distal portion of the cable clamp comprises a pair of nesting parts that slide relative to each other to selectively clamp or unclamp the cable, the looped component being coupled to one of the two nesting parts. Examples of such cable clamps are described in U.S. Pat. No. 7,567,741, the contents of which are hereby fully incorporated by reference.

According to further aspects of the present disclosure, a method comprises: hanging, with a first coupler, a proximal portion of a support at an aerial location of a structure, the support extending from a proximal end to a distal end and comprising a body; clamping a distal portion of a cable clamp to an optical cable; coupling, with a second coupler, a proximal portion of the cable clamp to a distal portion of the support; and mounting (optionally, with one or more straps or ties) an optical cable termination box having the optical cable routed thereto to the body of the support, wherein the coupling with the second coupler is such that a load of the optical cable bypasses the optical cable termination box and is at least partially transferred to the support through the body.

A variety of additional inventive aspects will be set forth in the description that follows. The inventive aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
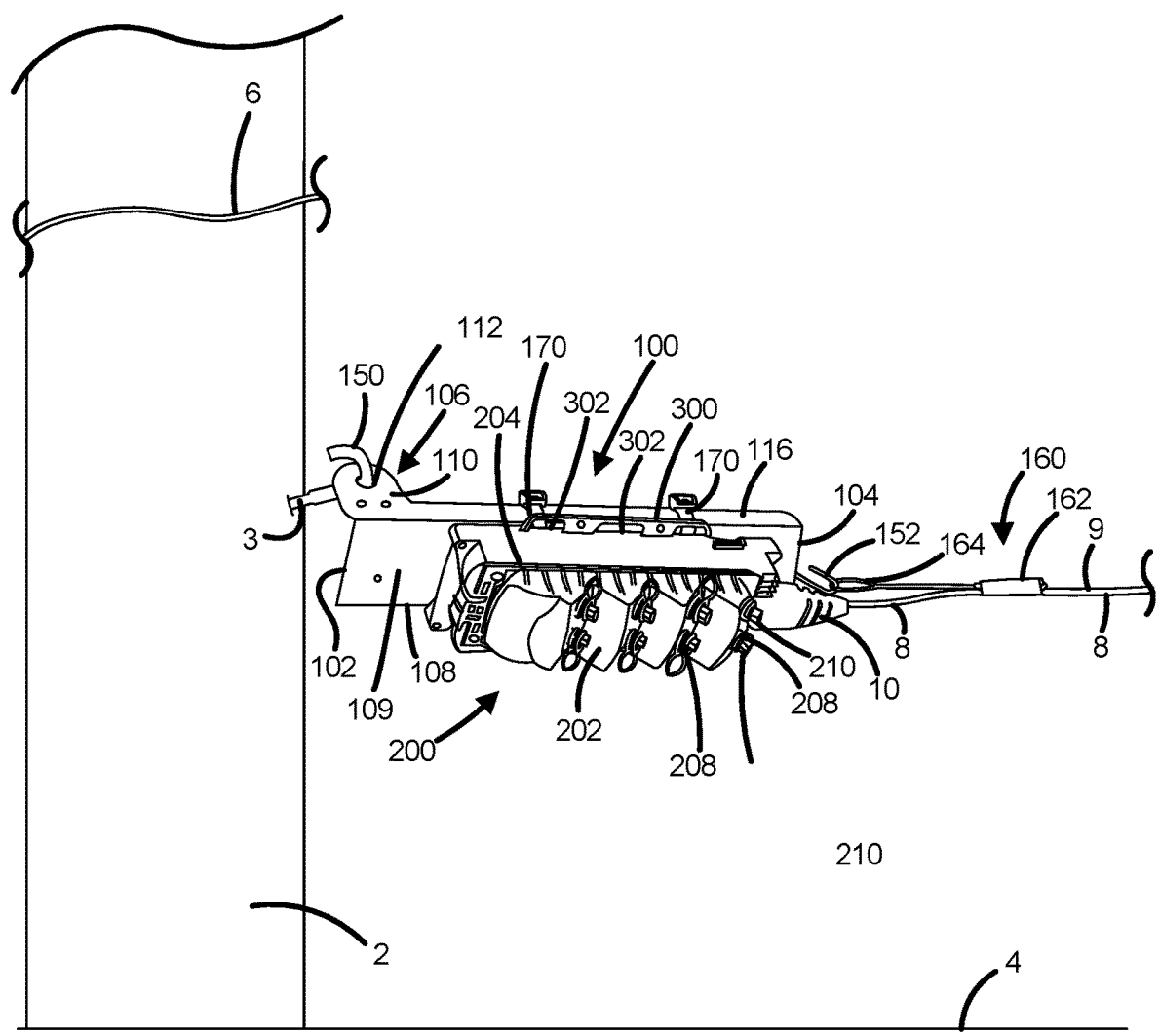
FIG. 1 depicts a usage example of an example support for mounting and aerially suspending an example optical cable termination box in accordance with the present disclosure.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Referring to FIGS. 1, 2, 6, and 7, and initially to FIG. 1, a drop cable 8 having an outer jacket 9 surrounding a plurality of optical fibers and, optionally, one or more strength members, is aerially suspended above the ground 4, being routed (along the drop cable's longitudinal axis) between a subscriber location (not shown, to the right of FIG. 1) at a distal end of the drop cable 8, and an optical cable termination box 200. The proximal end of the drop cable 8 is routed into the interior volume of the cable termination box 200 via a main port in the side of the box 200.

A flexible cable boot 10 positioned at the proximal end of the drop cable 8 plugs into or abuts the main port and helps to prevent over-bending and/or damage to the optical fibers of the drop cable 8 from lateral loads.

The optical cable termination box 200 includes a base 204 and a cover 202 that cooperate to define the interior volume of the cable termination box 200 and to provide selective access thereto, e.g., by separating the base 204 and the cover 202. The optical fibers from the drop cable 8 can be organized, routed, spliced, split, or otherwise managed within the interior volume of the cable termination box (using, e.g., one or more fiber managing structures housed in the interior volume of the cable termination box) and connected via ports 208 defined by the cover 202 to optical fibers of a main optical cable 6.

The ports 208 can be adapted to be selectively sealingly plugged with plugs 210 and selectively unplugged to receive (e.g., in adapters) fiber optic connectors terminating optical fibers routed from the main cable 6.

The main optical cable 6 is supported by a structure, in this case, a utility pole 2 extending upwards from the ground 4.

As depicted in FIG. 1, the cable termination box 200 is aerially suspended above the ground 4. In particular, the termination box 200 is coupled to a support 100, having a proximal end 102 and distal end 104. The support 100 is itself a bracket that mounts the termination box 200, is proximately coupled to the utility pole 2, and is distally coupled to the drop cable 8.

Figure 2:
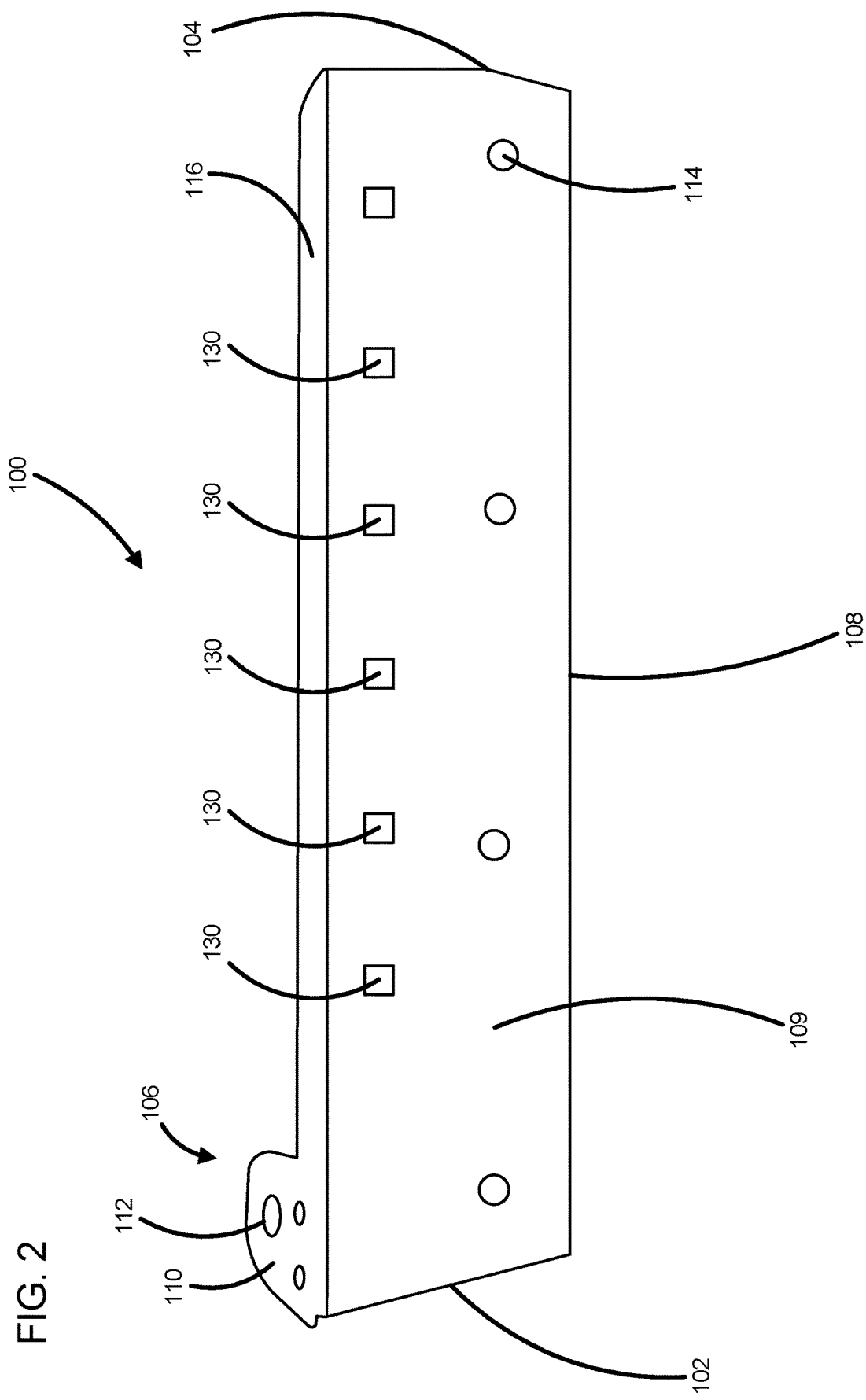
FIG. 2 is a perspective view of the support of FIG. 1.
Figure 3:
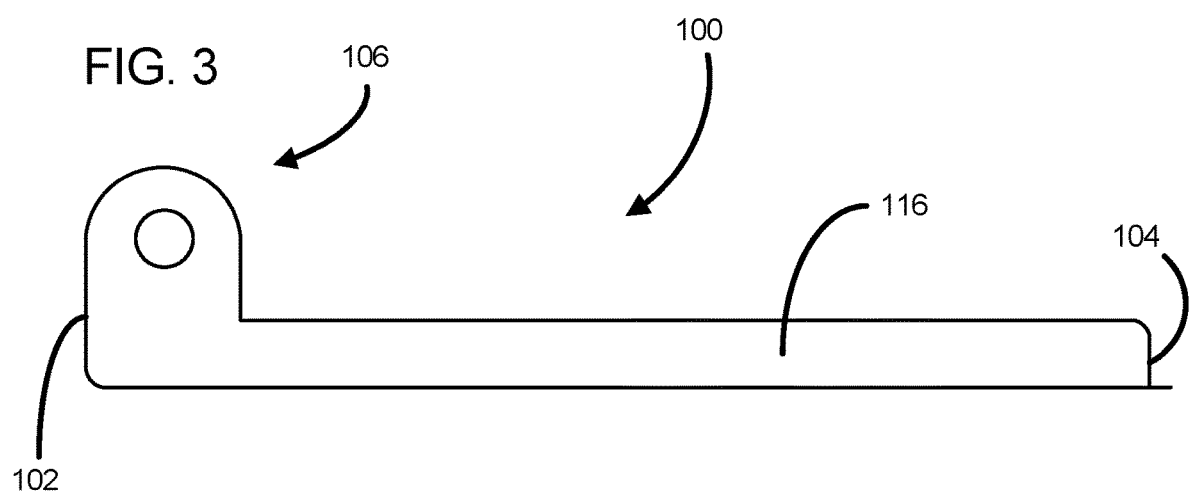
FIG. 3 is a side view of the support of FIG. 1.

The support 100 includes a body 108, a first or partial coupler 106, and a second coupler or partial coupler 114 (FIG. 2). In this example, the body 108 includes a plate or sheet 109 having a major surface, and a reinforcing wall 116. In this example, the first coupler/partial coupler includes a flange 110 at or towards the proximal end 102 and extending from the body 108, the flange 110 defining a through hole 112. In this example, the second coupler/partial coupler 114 is a through hole defined by the plate 109 positioned distally from the first coupler 112 and, in some examples, positioned at or near the distal end 104 of the support 100.

The through hole 112 is coupled to a complementary coupling feature, in this case the arm 157 (FIG. 6) of the J-hook 150, the J-hook being secured (e.g., screwed into) the utility pole 2 at an aerial position/location 3 on the utility pole 2.

The through hole 114 is coupled to a complementary coupling feature, in this case a proximal portion 153 (FIG. 7) of an S-hook 152. A distal portion 155 (FIG. 7) of the S-hook 152 is coupled to the looped component 164 of a cable clamp 160.

The cable clamp 160 includes a cable clamping portion 162 that, through wedging cooperation of two nesting pieces, clamps a segment of the drop cable 8. The looped component is attached to the clamping portion 162 and extends proximally from the clamping portion 162. In some examples, the cable clamp 160 is consistent with any of the cable clamps described in U.S. Pat. No. 7,567,741, the contents of which have been fully incorporated herein by reference.

The termination box 200 is coupled to the body 108 of the support 100 in any suitable way and using any suitable fasteners, e.g., screws, bolts, ties, or straps that can be coupled to the body 108 and, directly or indirectly, to the termination box 200.

In the example shown in FIG. 1, the base 204 of the termination box 200 has been mated with a termination box bracket 300, which includes one or more elongated slots 302 positioned on opposing sides of the termination box bracket 300 (only one such side is shown in FIG. 1). Examples of such termination box brackets are described in U.S. Pat. No. 7,558,458, the contents of which are hereby fully incorporated by reference in their entirety.

In the example shown in FIG. 1, one or more adjustable straps 170 (in this case there are two straps 170) couple the termination box bracket 300 to the body 108 of the support 100. For example, the straps 170 can wrap around the body 108, passing through some of the slots 302 on opposing sides of the termination box bracket 300.

The tightness of the coupling between the termination box 200 and the support 100 can be adjusted (e.g., with adjustable straps 170) to a desired level. In some examples, it can be preferable for the coupling to be sufficiently tight to substantially or entirely prevent any distal, proximal (or other) movement of the termination box 200 relative to the support 100 under anticipated conditions. In other examples, the tightness of the coupling can be selected to permit some degree of proximal or distal movement of the termination box 200 relative to the support 100 under anticipated conditions. Permitting such proximal and/or distal movement between the termination box 200 and the support 100 can, e.g., protect the termination box 200 from receiving incidental lateral or rotational loads when the drop cable 8 and/or the support 100 shift due to weather, work by a technician, or some other external condition or force.

Through the tension between the drop cable 8, the cable clamp 160, the S-hook 152, and the support 100, a load of the drop cable 8 is at least partially transferred to the support 100 via the body 108 of the support, the transferred load thereby bypassing the termination box 200. By way of illustration only, the portion of the drop cable 8 between the clamp 160 and the termination box 200 in FIG. 1 is depicted to have a slight sag as a way of illustrating the transfer of cable load to the support 100.

In the example shown in FIG. 1, it should be appreciated that the coupling of the through hole 112 and the J-hook 150 can allow for pivoting of the support 100 relative to the J-hook 150 when subjected to sufficient force. Such pivoting can advantageously allow the support 100 to shift when needed to absorb an incidental load occasioned by, e.g., weather, work by a technician, or some other external condition.

Still referring to FIG. 1, in this example the bottom of the base 204 of the termination box 200 faces the plate 109 and the cover 202 faces away from the plate 109, facilitating access by a technician positioned between the ground 4 and the termination box 200 to the cover 202 and the ports 208.

In this example, the flange 110 extends from the plate 109 in a direction that is non-parallel to the plane defined by the major surface of the plate 109. In this example, the flange 110 extends perpendicularly from the plate 109. In other examples, the flange 110 extends from the plate 109 at any angle to the plane defined by the major surface of the plate, e.g., 0°, 10°, 20°, 30°, 40°, 50°, 60°, 70°, 80°, or 90°. However, a non-parallel and, especially a perpendicular, relationship between the flange 110 and the plate 109 can facilitate maintaining of the termination box 200 once it is aerially suspended, e.g., by providing greater visibility of the termination box 200 from the ground 4.

Referring to FIG. 2, the body 108 can optionally define (e.g., in the plate 109) one or more additional through holes 130 which can receive fasteners (e.g., the straps 170 shown in FIG. 1 can be fed through the holes 130) to help couple a termination box to the support 100. However, such holes may not be necessary in some examples, and straps can be wrapped around outer edges of the body 108.

Still referring to FIG. 2, the reinforcing wall 116 is an optional feature that extends from the plate 109 at a non-parallel angle to the plane defined by the major surface of the plate 109. In this example, the reinforcing wall 116 extends perpendicularly from the plane defined by the major surface of the plate 109, and is integrally formed with, or machined to include, the flange 110 and the plate 109, the plate 109 being (optionally) integrally formed with, or machined to include, the flange 110. In this example the reinforcing wall 116 does not extend from the plate 109 as far as the flange 110 extends from the plate 109. In other examples, the reinforcing wall can extend more or less than shown as compared with the flange 110, or can be dispensed with altogether. The reinforcing wall 116 can provide structural integrity to the support 100.

The example support 100 can be molded or machined from a strong, rigid material (e.g., steel, aluminum, another similarly strong and rigid metal or alloy, and/or rigid plastic) and is sufficiently strong and rigid to support at least the weight of the termination box to which it is coupled. In some examples, the support 100 is sufficiently strong and rigid to support a multiple of the weight of the termination box to which it is coupled, such as 1.5 times that weight, 2 times that weight, 3 times that weight, 4 times that weight, 5 times that weight, or more.

Figure 4:
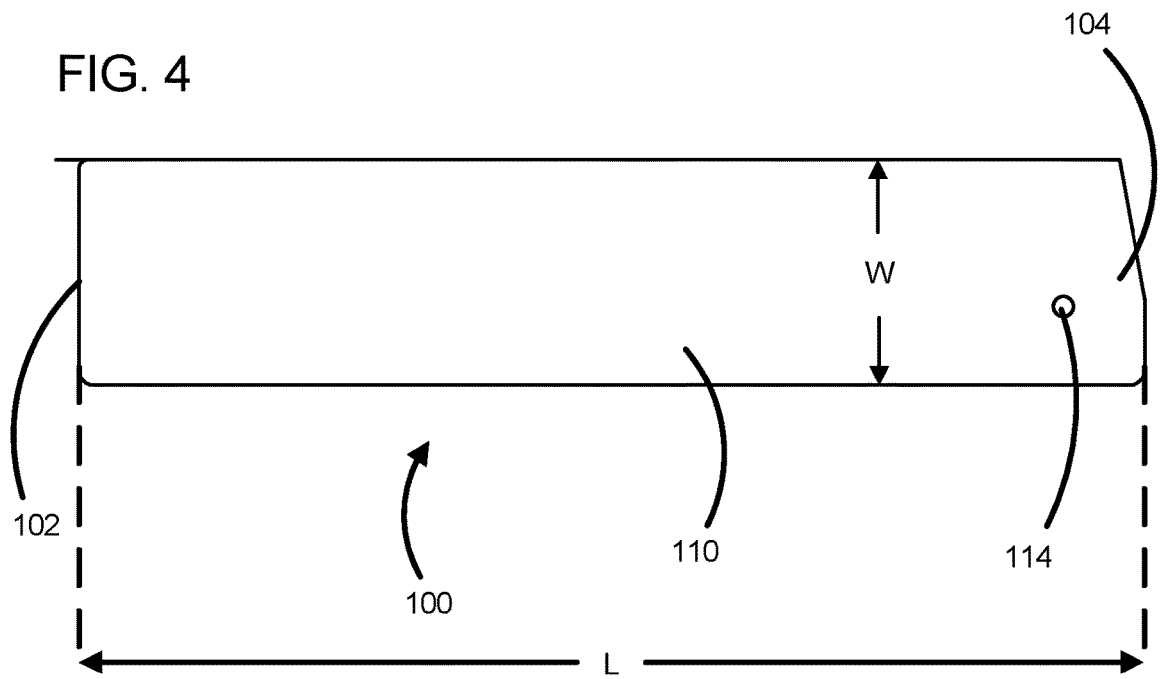
FIG. 4 is a bottom view of the support of FIG. 1.
Figure 5:
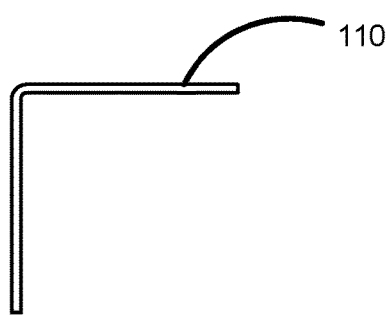
FIG. 5 is a cross-sectional view of the support of FIG. 1.

In some examples a length L (FIG. 4) of the plate 109 from the distal end 104 to the proximal end 102 is at least as long as a longest dimension of the termination box to which the support 100 can be coupled.

In some examples a width W (FIG. 4) of the plate 109 perpendicular to the proximal to distal length of the plate is at least as long as the corresponding dimension of a termination box to which the support 100 can be coupled.

In some examples, the plate 109 is at least substantially rectangular, or at least substantially square, or at least substantially round, or at least substantially trapezoidal, or at least substantially polygonal.

Figure 6:
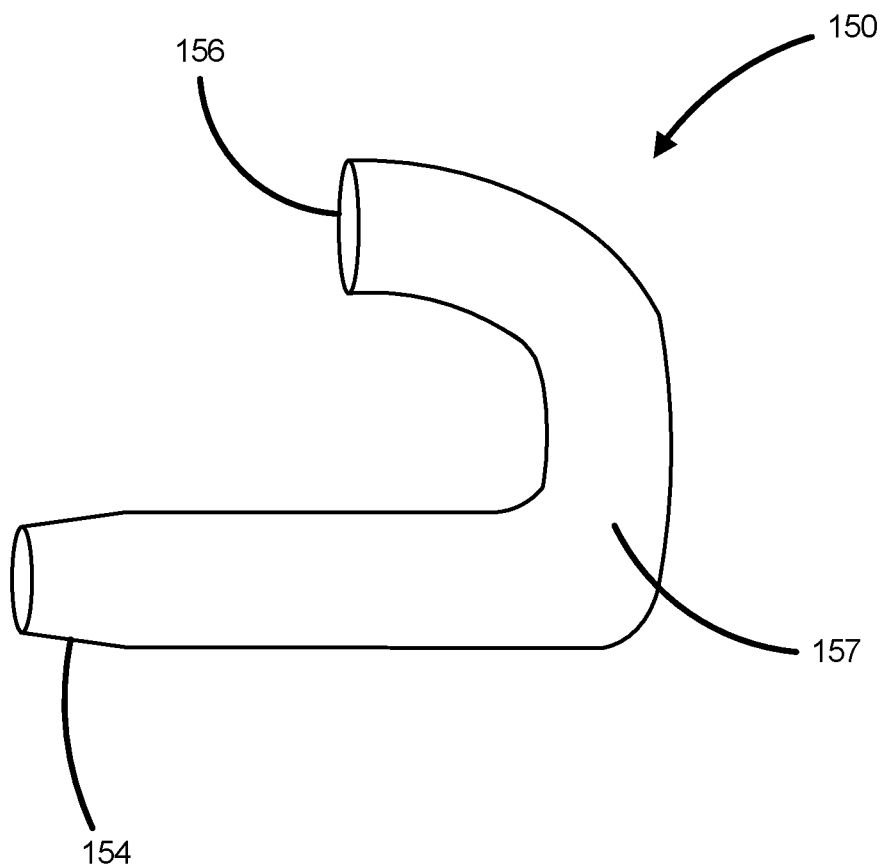
FIG. 6 is a schematic view of an example hook for coupling the support of FIG. 1 to an aerial location on a structure.
Figure 7:
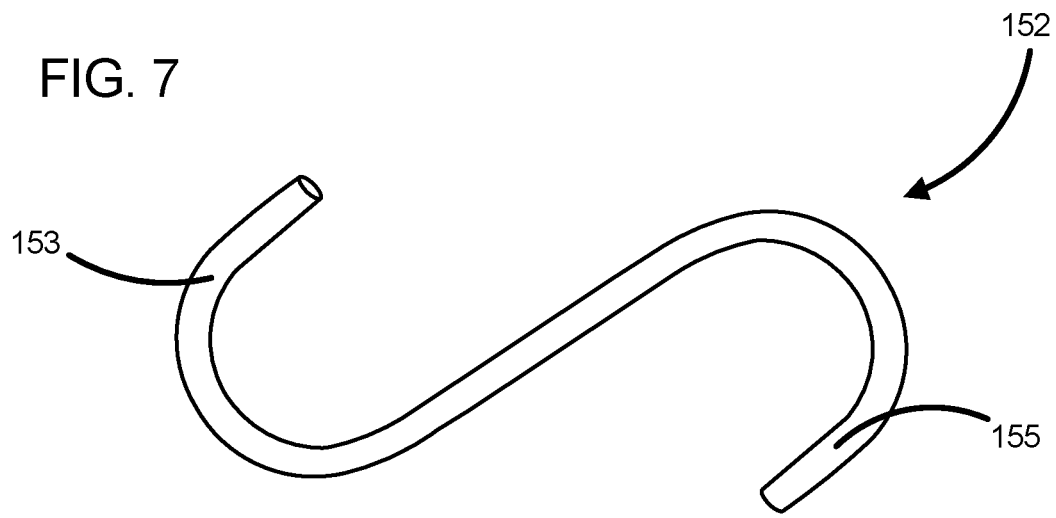
FIG. 7 is a schematic view of an example hook for coupling the support of FIG. 1 to a cable clamp.

Referring to FIG. 6, the J-hook 150 includes a mounting portion 154 for securing the J-hook to a structure (e.g., the utility pole 2 of FIG. 1), and an arm 157 extending from the mounting portion 154 to a free end 156 adapted to receive the through hole 112 of the support 100 (FIG. 2).

Figure 8:
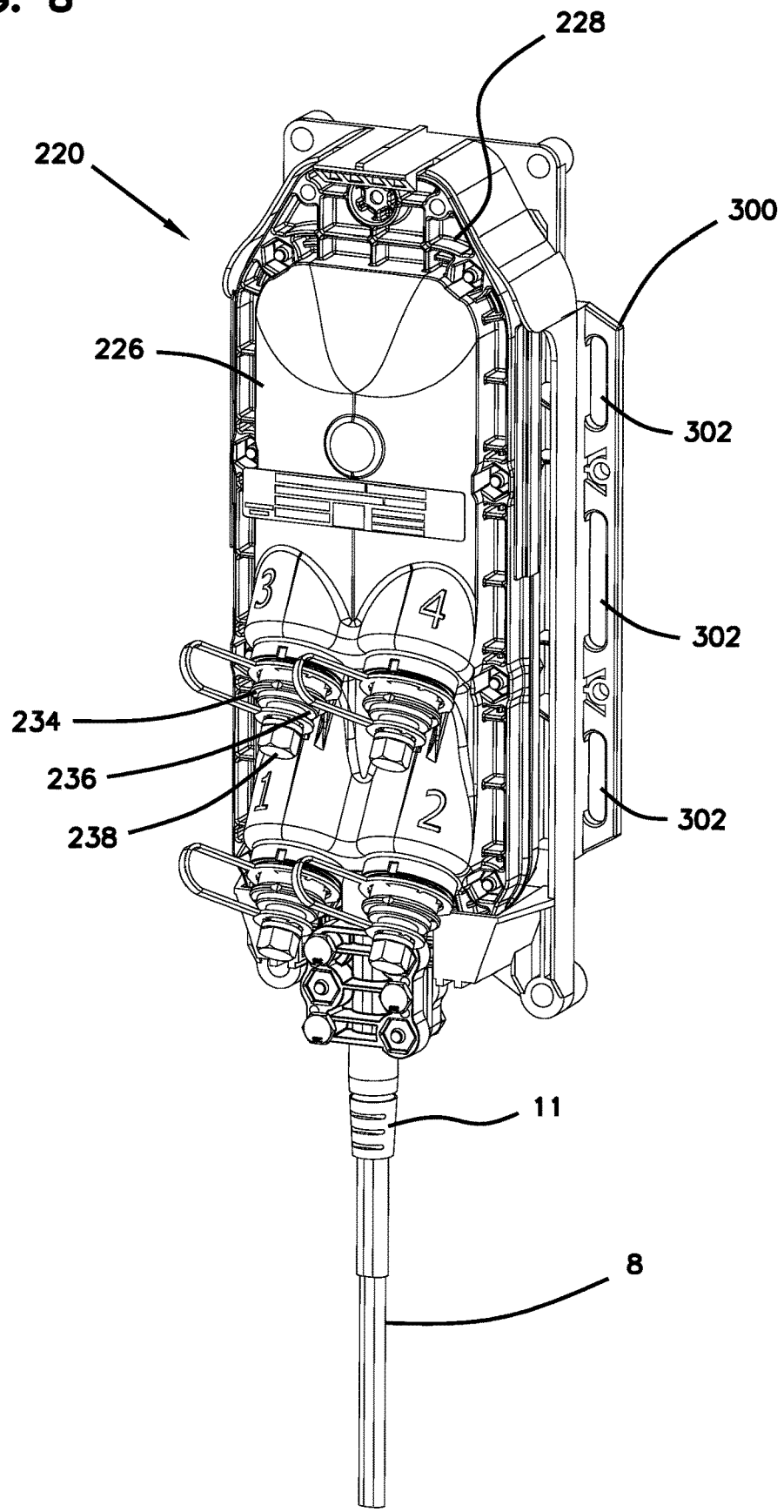
FIG. 8 depicts a further embodiment of an optical cable termination box that can be aerially suspended using the support of FIG. 1.

Referring now to FIG. 8, an alternative embodiment of an optical termination box 220 is depicted. The termination box 220 is another example termination box that can be aerially suspended using the support 100 as described above.

The termination box 220 is mated to the bracket 300 described above. The termination box 220 includes a cover 226 and a base 228 that together define a selectively accessible interior volume. A drop cable 8 enters the interior volume via a main port defined by the box 220, passing through a flexible cable boot 11. The cover 226 defines adapters 234 having ports 236 that are selectively pluggable with plugs 238. When unplugged, the adapters 234 can receive connectors that terminate optical fibers coming from e.g., a main cable, such as the main cable 6 of FIG. 1.

Although in the foregoing description, terms such as "top," "bottom," "proximal," "distal," etc. were used for ease of description and illustration in relating features to one another, no restriction on the use of the components and assemblies of this disclosure is intended by such use of the terms.

Having described the preferred aspects and embodiments of the present disclosure, modifications and equivalents of the disclosed concepts may readily occur to one skilled in the art. However, it is intended that such modifications and equivalents be included within the scope of the claims which are appended hereto.

What is claimed is:

1. A support for mounting and aerially suspending an optical cable termination box, the optical cable termination box having a cable routed thereto, the support comprising:
   a body for supporting at least a portion of a weight of the optical cable termination box;
   a first coupler for coupling the body to an aerial location of a structure; and
   a second coupler for coupling the body to an optical cable such that a load of the optical cable bypasses the optical cable termination box and is at least partially transferred to the support through the body.

2. The support as in claim 1, wherein the cable includes a plurality of first optical fibers, and wherein one or more of the first optical fibers are connectable, via one or more of a plurality of ports defined by the optical cable termination box, to one or more second optical fibers in a main optical cable that is supported by and/or routed via the structure.

3. The support as in claim 1, wherein the structure comprises a utility pole.

4. The support as in claim 1, wherein the first coupler and/or the second coupler comprises a through hole.

5. The support as in claim 1, wherein the first coupler and/or the second coupler comprises a hook or a portion of a hook.

6. The support as in claim 1, wherein the first coupler and/or the second coupler comprises one or more straps, hooks, ties, nails, screws, bolts, pins, and/or staples.

7. The support as in claim 1, wherein the optical cable termination box comprises a base and a cover that sealingly cooperate to define an interior volume housing one or more structures for organizing, routing, splitting and/or splicing optical fibers, and wherein the cover defines one or more pluggable ports for selectively receiving fiber optic connectors terminating optical fibers that can be connected, via the termination box, to optical fibers of a drop cable.

8. The support as in claim 1, wherein the support is adapted to couple the optical cable termination box such that a base of the optical cable termination box faces the body of the support and is closer to the body of the support than a cover of the optical cable termination box.

9. The support as in claim 1, wherein the body comprises a reinforcing wall.

10. The support as in claim 1, wherein the first coupler comprises a J-hook, and wherein the second coupler comprises an S-hook.

11. The support as in claim 1, wherein the second coupler is adapted to be coupled to a looped component of a cable clamp clamped to the cable.

12. The support as in claim 1, wherein the first coupler is adapted to pivotally couple the body to the aerial location of the structure.

13. The support as in claim 1, wherein the body of the support comprises a plate, or comprises a bracket having a plate, to which the termination box is couplable and/or affixable.

14. The support as in claim 13, wherein the plate has a major surface that defines a plane, and wherein the first coupler comprises a flange extending from the plate.

15. The support as in claim 14, wherein the flange includes a through hole for coupling the flange to a complementary fastener secured to the structure.

16. The support as in claim 15, wherein the complementary fastener is a J-hook.

17. The support as in claim 14, wherein the flange extends from the plate in a direction that is non-parallel to the plane defined by the major surface of the body.

18. The support as in claim 17, wherein the flange extends from the plate at an oblique angle to the plane defined by the major surface of the body.

19. The support as in claim 17, wherein the flange extends from the plate perpendicularly to the plane defined by the major surface of the body.

20. A support for mounting and aerially suspending an optical cable termination box, the optical cable termination box having a cable routed thereto, and the support extending from a proximal end to a distal end and comprising:
   a body for supporting at least a portion of a weight of the optical cable termination box;
   a first coupler for coupling a proximal portion of the support to an aerial location of a structure; and
   a second coupler for coupling a distal portion of the support to the cable such that a load of the optical cable bypasses the optical cable termination box and is at least partially transferred to the support through the body.

21. A support for mounting and aerially suspending an optical cable termination box, the optical cable termination box having a cable routed thereto, the support comprising:
   a body for supporting at least a portion of a weight of the optical cable termination box;
   a first means for coupling the body to an aerial location of a structure; and
   a second means for coupling the body to an optical cable such that a load of the optical cable bypasses the optical cable termination box and is at least partially transferred to the support through the body.

22. A support for mounting and aerially suspending an optical cable termination box, the optical cable termination box having a cable routed thereto, and the support extending from a proximal end to a distal end and comprising:
   a body for supporting at least a portion of a weight of the optical cable termination box;

a first means for coupling a proximal portion of the support to an aerial location of a structure; and a second means for coupling a distal portion of the support to the cable such that a load of the optical cable bypasses the optical cable termination box and is at least partially transferred to the support through the body.

\* \* \* \* \*